(12) United States Patent
Seglo et al.

(10) Patent No.: US 9,353,814 B2
(45) Date of Patent: May 31, 2016

(54) DRUM BRAKE ASSEMBLY AND WEAR MONITORING DEVICE FOR SUCH AN ASSEMBLY

(75) Inventors: Fredrik Seglo, Viken (SE); Anders Larsson, Helsingborg (SE)

(73) Assignee: Haldex Brake Products AB, Landskrona (SE)

( * ) Notice: Subject to any disclaimer, the term of this patent is extended or adjusted under 35 U.S.C. 154(b) by 3 days.

(21) Appl. No.: 14/007,461

(22) PCT Filed: Mar. 25, 2011

(86) PCT No.: PCT/EP2011/001519
§ 371 (c)(1),
(2), (4) Date: Oct. 17, 2013

(87) PCT Pub. No.: WO2012/130253
PCT Pub. Date: Oct. 4, 2012

(65) Prior Publication Data
US 2014/0034427 A1 Feb. 6, 2014

(51) Int. Cl.
*F16D 66/02* (2006.01)
*F16D 125/30* (2012.01)
*F16D 125/56* (2012.01)

(52) U.S. Cl.
CPC ............. *F16D 66/02* (2013.01); *F16D 66/025* (2013.01); *F16D 66/026* (2013.01); *F16D 2125/30* (2013.01); *F16D 2125/56* (2013.01)

(58) Field of Classification Search
CPC ..... F16D 66/02; F16D 66/025; F16D 66/026; F16D 2125/30; F16D 2125/56
USPC ........................................ 188/1.11 R, 1.11 W
See application file for complete search history.

(56) References Cited

U.S. PATENT DOCUMENTS

| 3,776,329 | A | | 12/1973 | Hope et al. | |
|---|---|---|---|---|---|
| 5,253,735 | A | | 10/1993 | Larson et al. | |
| 5,358,076 | A | * | 10/1994 | Lucas | 188/1.11 R |
| 5,535,854 | A | * | 7/1996 | Prince | 188/1.11 R |
| 6,273,218 | B1 | | 8/2001 | Kramer | |
| 6,390,244 | B1 | * | 5/2002 | Sitter | 188/1.11 W |
| 2006/0076195 | A1 | * | 4/2006 | Salazar | 188/1.11 R |

FOREIGN PATENT DOCUMENTS

| CN | 1920325 A | 2/2007 |
|---|---|---|
| DE | 19534854 A1 | 3/1997 |
| EP | 1640632 A2 | 3/2006 |
| JP | S548299 Y2 | 4/1979 |
| JP | H05321964 A | 12/1993 |
| WO | 9641970 A1 | 12/1996 |

OTHER PUBLICATIONS

International Search Report Application No. PCT/EP2011/001519 Completed: Nov. 29, 2012; Mailing Date: Dec. 6, 2012 4 pages.
International Preliminary Report on Patentability and Written Opinion of the International Searching Authority Application No. PCT/EP2011/001519 Issued: Oct. 1, 2013 6 pages.

* cited by examiner

*Primary Examiner* — Vishal Sahni
(74) *Attorney, Agent, or Firm* — St Onge Steward Johnston and Reens LLC

(57) ABSTRACT

A drum brake assembly with a camshaft and a wear monitoring device for measurement of the wear status, the wear monitoring device and the camshaft including alignment mechanisms which enable and ensure that only one particular angular position between the camshaft and a rotating element of the wear monitoring device is possible.

14 Claims, 8 Drawing Sheets

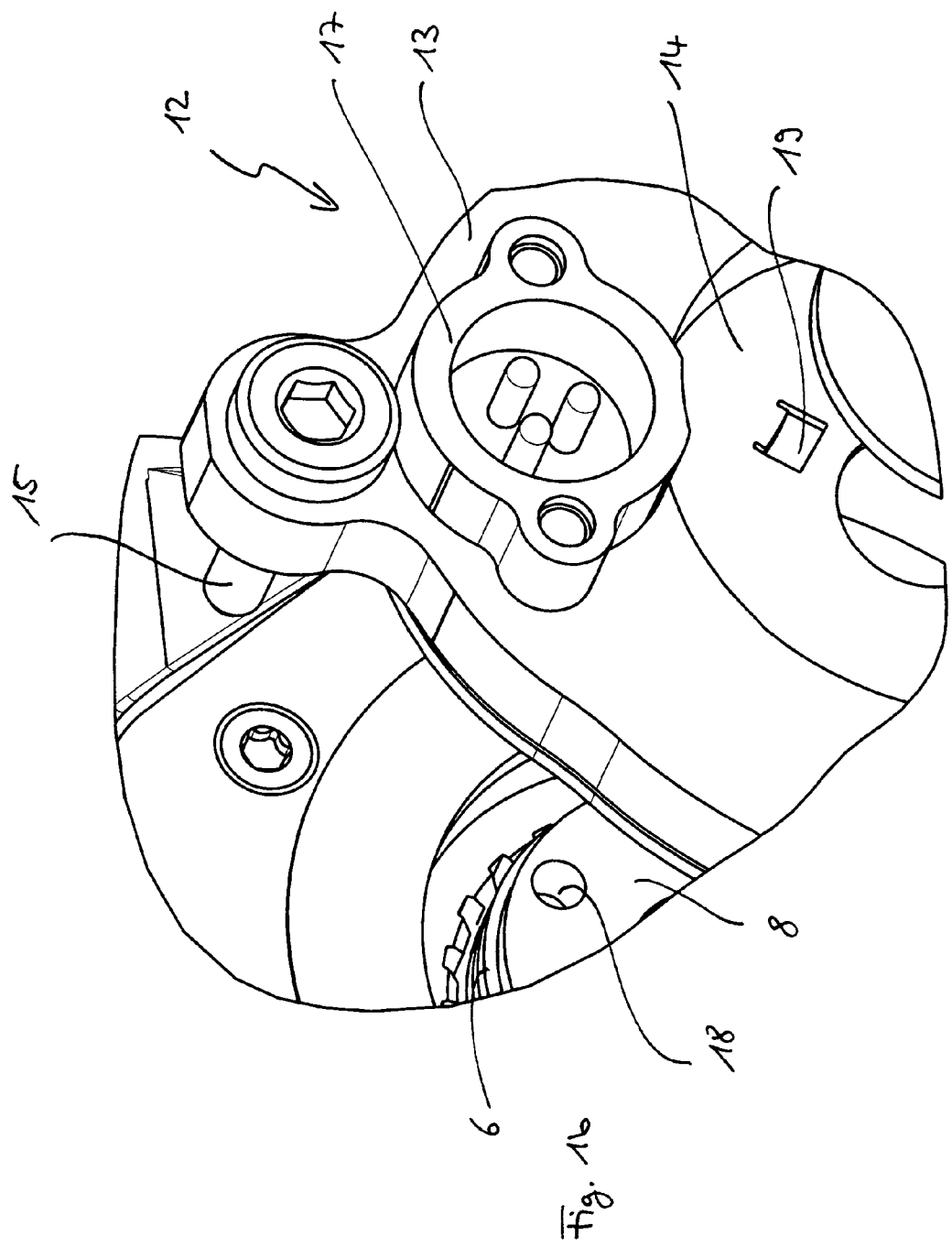

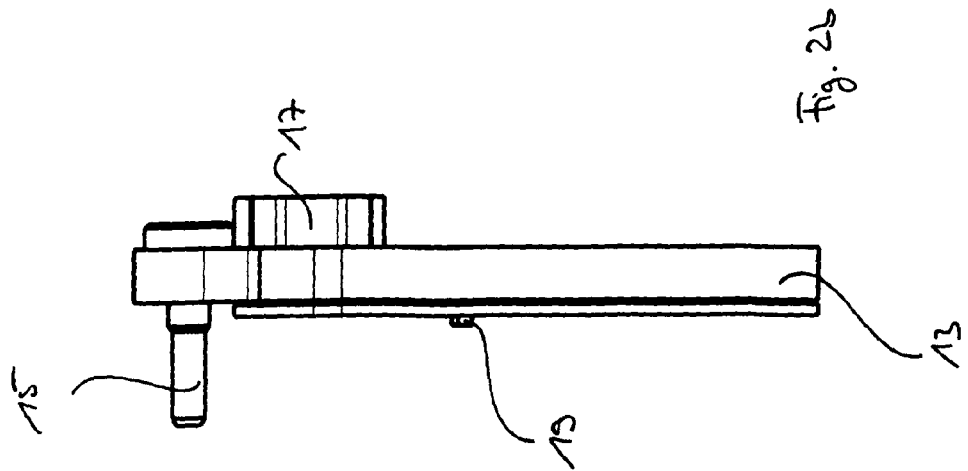
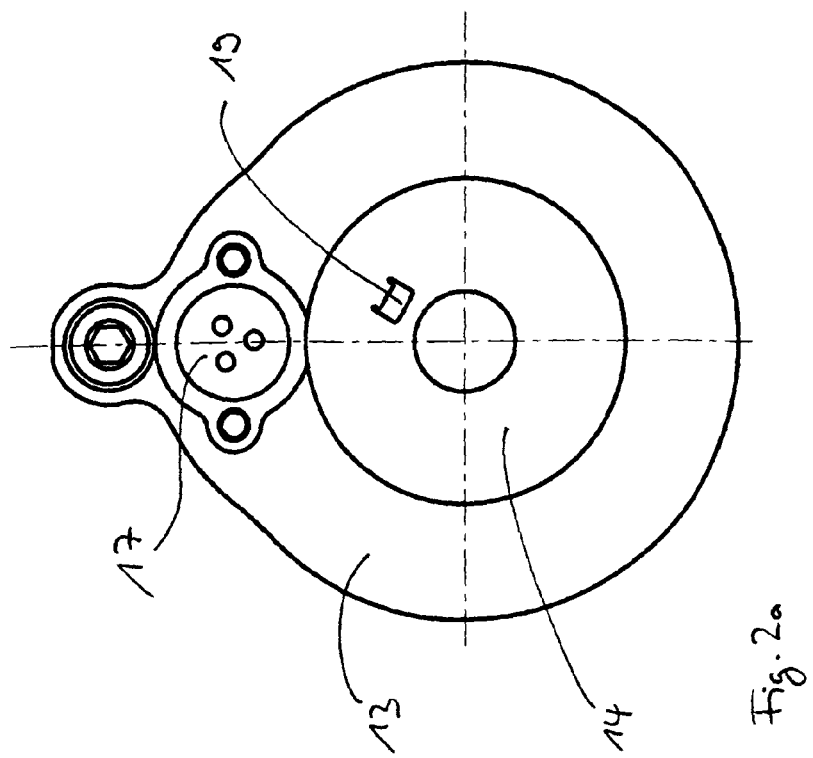
Fig. 2a
Fig. 2b

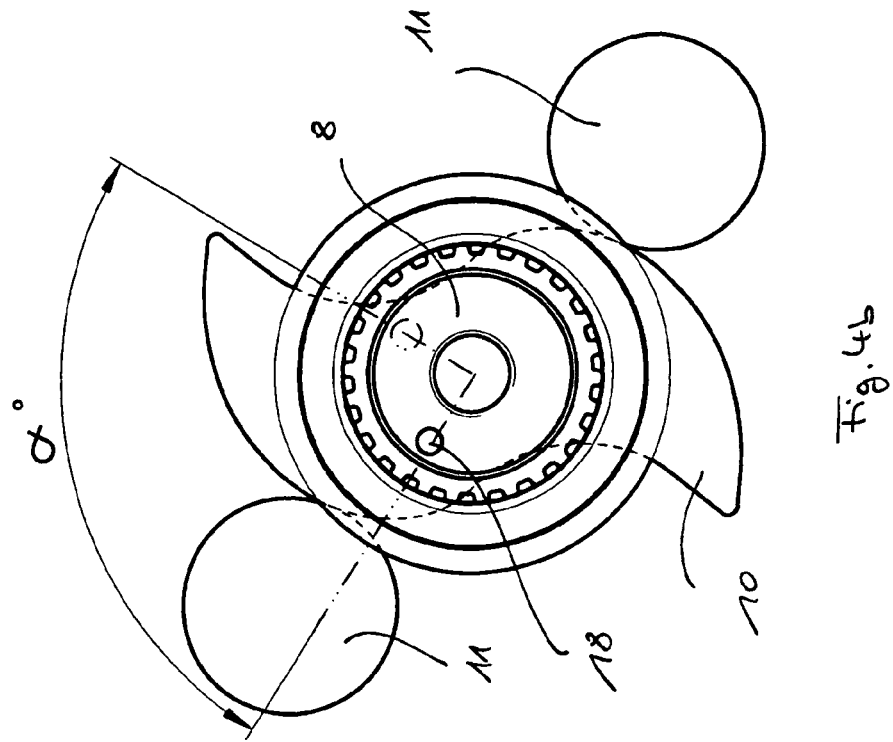
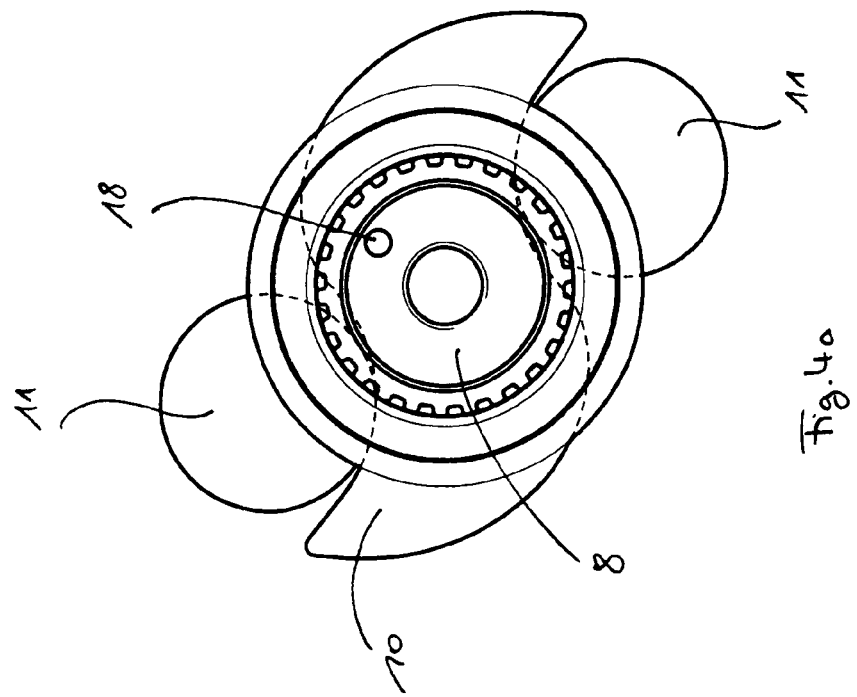

DRUM BRAKE ASSEMBLY AND WEAR MONITORING DEVICE FOR SUCH AN ASSEMBLY

FIELD OF THE INVENTION

The present invention refers to a drum brake assembly comprising a camshaft for the actuation of brake shoes in a brake drum and a lever actuating the camshaft. Further, the invention refers to a wear monitoring device to be employed in such drum brake mechanisms. Several components of the drum brake assembly, which cooperate which such a wear monitoring device, are considered by this invention as well.

BACKGROUND OF THE INVENTION

In vehicle brakes, at least one rotor connected to a wheel is braked by friction elements to be applied to the rotor during brake actuation. In drum brakes, brake shoes are radially and tangentially moved towards the rotating brake drum, the brake shoes being arranged inside the brake drum and spread by means of a cam in fixed connection with a camshaft, which camshaft is set into rotation by a lever of an actuating mechanism. The configuration of the cam could be in the form of a S-cam, Z-cam or any other well-known profiles.

At one of its axial ends the camshaft is connected to the lever of the brake actuator by means of a splined connection to enable a rotatably fixedly connection between these elements. At its opposite end, the camshaft comprises the cam profile for actuating the brake shoes so that upon rotation of the camshaft these do radially converge towards the inner surface of the rotating brake drum and finally engaging therewith.

The brake lever setting the camshaft into rotation usually comprises an automatic brake adjuster mechanism for compensation of the wear of the brake shoes and of the inner friction surface of the brake drum. Such automatic brake adjuster mechanism is built in the housing of the brake lever and is configured to create a relative displacement between the lever arm and inner parts of the automatic brake adjuster mechanism which are connected to the camshaft. The produced displacement corresponds to the actual wear of the brake linings and of the friction surface inside the brake drum.

To preclude malfunction of the drum brake mechanism, for safety reasons it is necessary to monitor the wear status of the entire mechanism.

For that purpose it is known to use wear monitoring devices which are attached to the end of the camshaft opposite of the cam, i.e. at the end which faces away from the brake drum. Such sensors are known with different configurations and are designed to either produce alarm signals when the wear of the brake linings and the brake drum exceeds a certain value predetermined to constitute a critical threshold or to produce continuously signals to superior monitoring control systems in the vehicle, which signals resemble the actual wear status.

Commonly known wear monitoring devices are known from e.g. publication U.S. Pat. No. 5,253,735 and WO 96/41970 of the applicant.

Such wear monitoring devices basically consist of a housing in which a rotating element is rotatably supported. The rotating element, usually in the form of a disc will be rotatably fixedly connected to the camshaft, whereby the housing remains stationary with respect to the rotating element and thus the camshaft. The housing of the wear monitoring device therefore has somehow to be mounted in a position which is fixed relative to the rotatable camshaft. The sensing mechanism to be employed in such wear monitoring devices could be of any known kind, like e.g. Hall devices, coded discs, potentiometers etc.

The camshaft comprises for its rotatably fixedly connection to the lever and to its corresponding part of the built-in automatic brake adjuster mechanism a splined section with splines which are uniformly distributed around the circumference of the camshaft. These splines are normally used for rotational fixation of the rotating element of the wear monitoring device to the camshaft as well. Alternatively, the rotating element could be clamped somehow to the periphery of the camshaft.

The rotating element constitutes the input part for the actual sensor arranged inside the housing of the wear monitoring device and its rotations reflect the rotations of the camshaft both during brake actuation and release on the one hand and the turns initiated by the automatic brake adjuster mechanism of the brake lever during automatic adjustment on the other.

It becomes obvious that the assembly of the wear monitoring device, in particular its installation at the camshaft requires properly aligned adjustments between the rotating element and the camshaft since otherwise there exists the risk that the wear monitoring device could deliver erroneous information about the actual wear status which thus could lead do safety hazards.

As this has to be performed manually, this in turn speaks for personnel which has to practice certain skills and which requires peculiar training for that purpose. Thus, assembly of the wear monitoring devices for drum brakes as known from the prior art both for installation and servicing will be time consuming associated with higher costs. Still then it cannot be avoided that the final installation is erroneous with respect to the alignment between the respective components.

SUMMARY OF THE INVENTION

Based on that it is an objective of the present invention to provide a drum brake assembly for which the installation of a wear monitoring device is more effective and at the same time provides a fail-safe assembly.

Such objective is solved by a drum brake assembly and by a wear monitoring device for such a drum brake assembly. The new design of several components of the drum brake assembly, such as brake lever and camshaft, contributes to the solution of the problems.

The invention provides a drum brake assembly comprising a camshaft for the actuation of brake shoes in a brake drum and a lever actuating the camshaft, the camshaft comprising opposite to its cam end a splined section, whereby the lever is being rotatably fixedly connected to the splined section by means of a splined groove section, further comprising a wear monitoring device for measurement of the wear status of the brake shoes, the wear monitoring device comprising a housing statically arranged relative to the camshaft and a rotating element rotatably arranged in the housing and rotatably fixedly connected to the splined section of the camshaft, whereby the camshaft comprises at least one alignment means and in that the wear monitoring device comprises at least one alignment means, which alignment means are configured to cooperate with each other and are arranged to allow only one particular angular position between the camshaft and the rotating element of the wear monitoring device.

The at least one alignment means of the camshaft is therefore arranged in a particular angular position also in relation to the expanding profiles of the cams which are located inside the brake drum. The angular position of the alignment means will be determined at manufacture of the camshaft, correspondingly.

Accordingly, the wear monitoring device in its entirety can be installed on and in relation to the camshaft in one single angular position only, which from the beginning does preclude any other angular positions for the assembly by the installation and servicing personnel. As the installation of the wear monitoring device can be performed in one possible way regarding its angular position only, improper angular adjustment at installation or at re-installation in connection with service work is automatically and completely avoided. In turn, the risk of incorrect wear signals arriving from such irregular adjustment and installation works is eliminated, which results in improved road safety as it becomes less probable that vehicles with worn out brakes are on the road.

In a further embodiment of the invention, the rotating element of the wear monitoring device comprises the alignment means in such a way that only one particular angular position between the camshaft and the rotating element and in relation to the housing of the wear monitoring device is possible, which housing is stationary with respect to the camshaft. In other words, the angular position is also determined by the position of the housing relative to the lever or to an underframe part of the vehicle.

Accordingly, in one aspect of the invention a brake lever to be embodied in such a drum brake assembly for actuation of a camshaft, which lever comprises a housing and a splined groove section for rotatably fixedly connection to the splined section of the camshaft, further comprises fixation means to cooperate with fixation means of a housing of a wear monitoring device for the drum brake assembly, whereby the fixation means are configured to cooperate with each other and are arranged to allow only one particular angular position between the camshaft and the rotating element of 5 the wear monitoring device in relation to the housing of the brake lever.

The fixation means further ensure that the wear monitoring device is provided with a correct angular reference for its proper functioning. For provision of the angular reference, the housing of the wear monitoring device could be either attached to the lever or to an underframe part of the vehicle. In cases in which the housing of the wear monitoring device containing the rotating element is fixed to the housing by the fixation means, the lever in fact has a particular fixed angular position in relation to the underframe part of the vehicle when the drum brake assembly is in its release position.

Furthermore, in one peculiar embodiment of the drum brake assembly according to the invention, the alignment means of both the camshaft and the rotating element are configured so as to also rotatably fixedly connect the camshaft with the rotating element. In other words, the alignment means are not only configured to determine the angular position between these respective components but to also fixedly connect them together in their common angular position as defined to transmit the rotational movement of the camshaft into the wear monitoring device. In such an embodiment the splines of the splined section thus do not need to serve as the connecting means with the rotating element.

In one aspect of the invention the alignment means of the camshaft could be arranged on the peripheral surface of its splined section and/or be integral with the splines of the splined section. These alignment means could be specifically made as a geometric alteration in the form of a recess, hole, protrusion or deviation in the repetitive pattern of the splines.

Correspondingly, the alignment means of the wear monitoring device, in particular of the rotating element of it are made so as to match with the alignment means of the camshaft in a substantial complementary manner with respect to their shape. For ease of assembly, the tolerances of these alignment means are selected to enable manual installation.

However, the splines of the splined section will normally not be manufactured with any predetermined angular position in relation to the expanding profiles of the cams on the end opposite of the splined section. In such cases it is according to the invention preferred that the alignment means of the camshaft are provided separate from the splines in a way that ensures a particular angular position of the alignment means in relation to the expanding cam profiles. Such means could be done by machining a hole or a recess or by providing a protrusion to the camshaft, the latter can be included upon the forging process of the camshaft.

In a preferred embodiment of the invention, the alignment means of the camshaft shall be arranged on its face side of the splined section in the form of a hole or protrusion. A cost effective way would be to drill an axial hole into the face of the axial end of the splined section of the camshaft.

The alignment means of the camshaft in any case cooperate with the alignment means of the wear monitoring device, which is arranged at its rotating element, in a matching complementary manner.

The rotating element of the wear monitoring device is configured as a rotating disc and preferably made from sheet metal. Upon manufacturing of the sheet metal disc, which will be rotatably supported in the housing of the wear monitoring device, such alignment means could be easily and cost-effectively produced during the punching, stamping and/or pressing process of the disc.

In another preferred embodiment of the rotating element made from sheet metal the alignment means are made as a tongue protruding towards the camshaft. The tongue can be easily produced by stamping and then bending out from the disc. Alternatively, the rotating element could be also made from plastics in which a protrusion could be simply made during the molding process.

According to the invention the alignment means of the rotating element of the wear monitoring device have a defined angular position in relation to the internal sensor elements, e.g. magnets and Hall sensors, arranged both to the rotating element and to the inside of the housing.

It becomes apparent from the above description of the invention, that a wear monitoring device according to the invention can be quickly installed with the highest accuracy. No more excessive installation time is needed for any additional adjustment work to properly align the rotating element of the wear monitoring device with the camshaft. This will save costs, moreover, since installation and servicing personnel does not have to be so well trained anymore.

BRIEF DESCRIPTION OF THE DRAWINGS

Further advantages and embodiments do become apparent from the description of the different embodiments in connection with the enclosed drawings, in which;

FIG. 1B is an enlarged view of FIG. 1a showing alignment means according to the invention;

FIG. 1C is a side view of the part of the actuation mechanism with mounted wear monitoring device of FIG. 1a;

FIG. 2A is a front view of the wear monitoring device as shown in FIGS. 1a-c;

FIG. 2B is a side view of the wear monitoring device as shown in FIGS. 1a-c;

FIG. 3C is a side view of the part of the actuation mechanism with mounted wear monitoring device of FIG. 3a;

FIG. 4A is a front view schematically showing the camshaft in relative position to bearing pins of unworn brake shoes in brake release position; and FIG. 4B is a front view schematically showing the camshaft in relative position to the bearing pins of worn brake shoes in brake release position after compensation.

DETAILED DESCRIPTION OF THE INVENTION

Figure 1A:
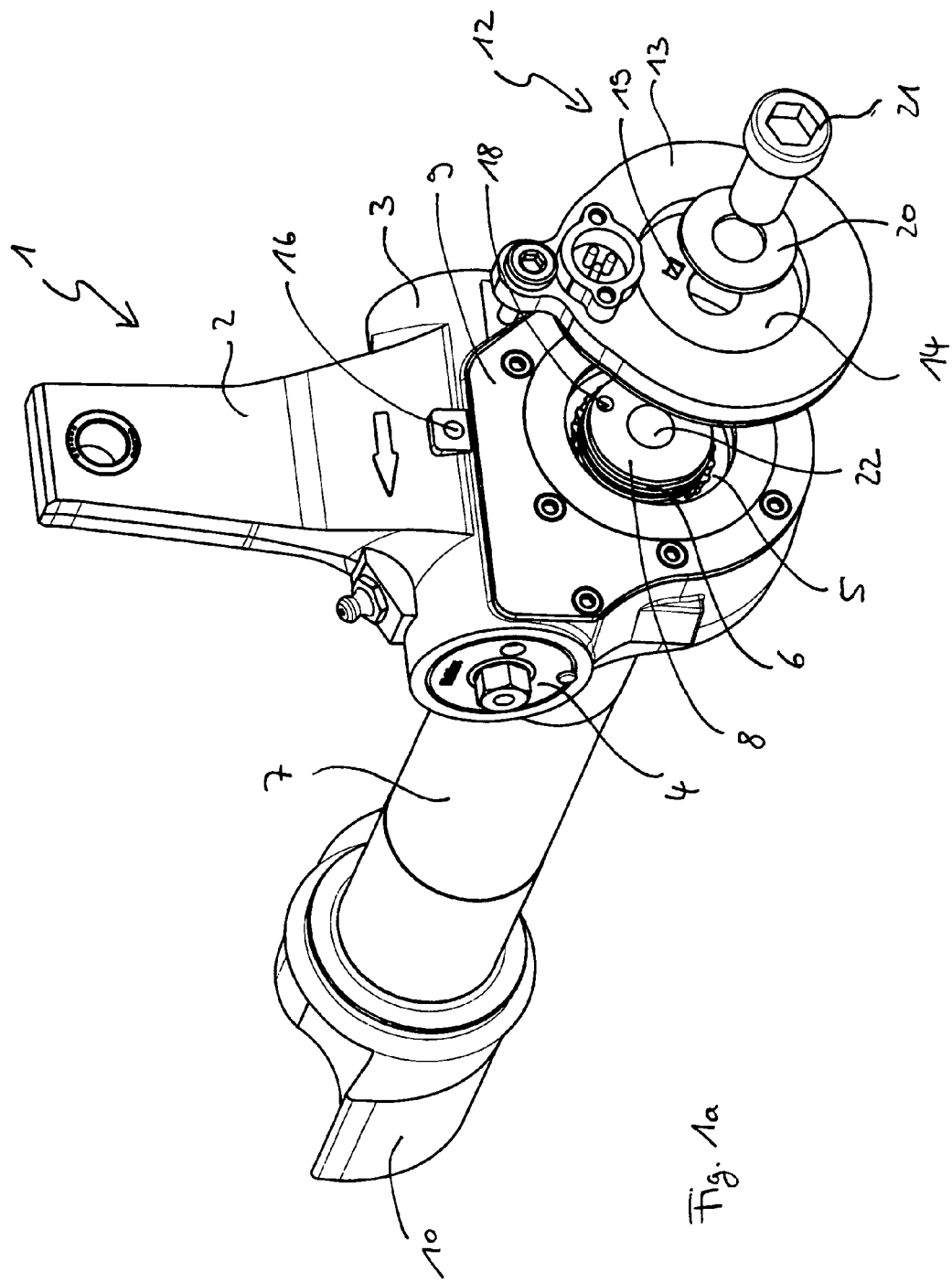
FIG. 1A is a perspective view showing part of the actuation mechanism of a drum brake assembly with lifted wear monitoring device according to a first embodiment of the invention.
Figure 3A:
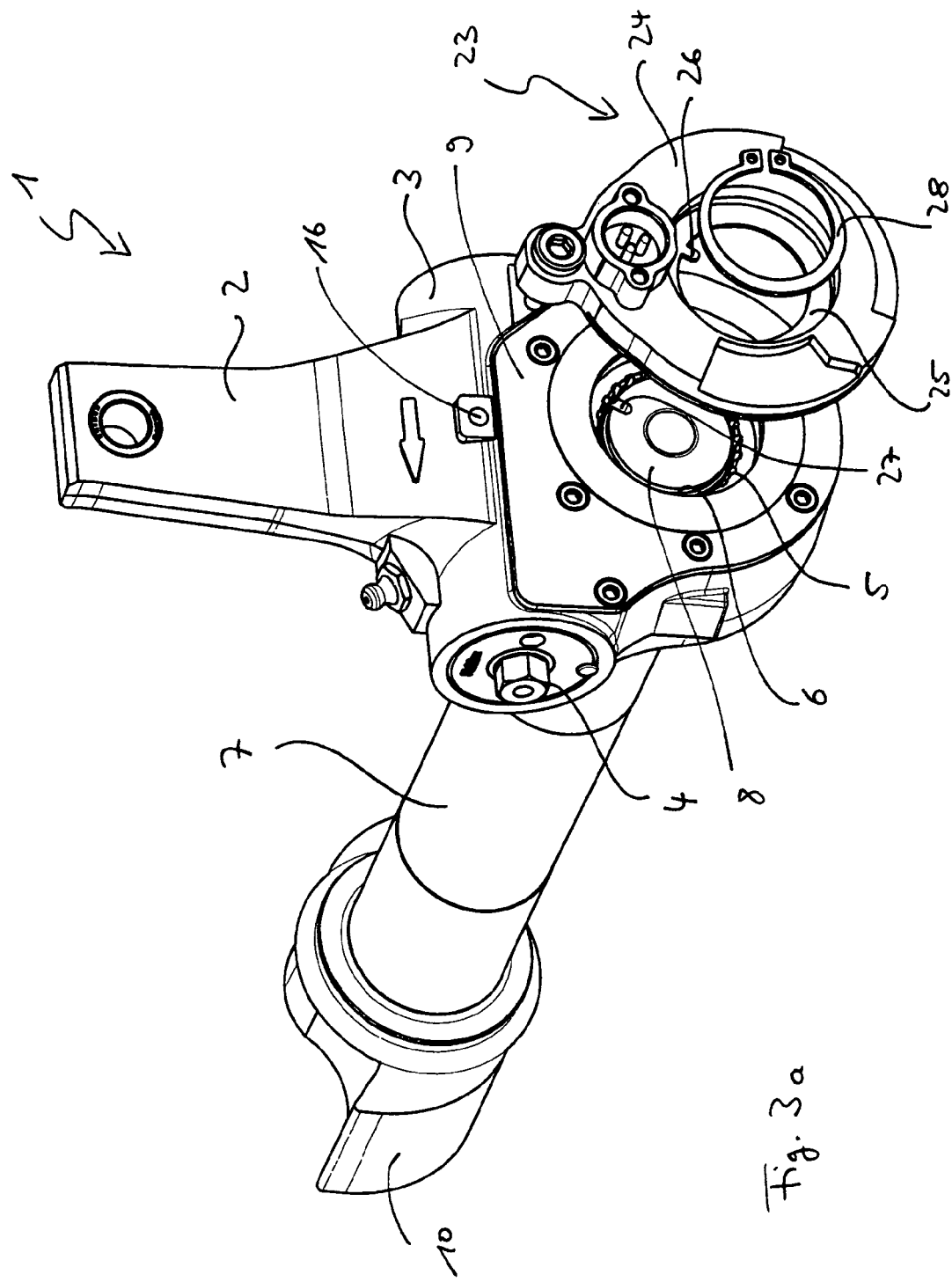
FIG. 3A is a perspective view showing part of the actuation mechanism of a drum brake assembly with lifted wear monitoring device according to a second embodiment of the invention.

FIGS. 1a and 3a each show exemplarily part of a brake actuating mechanism for a drum brake assembly according to the invention.

A lever 1 is made of cast iron and comprises an upper lever section 2 which attaches to a piston rod (not shown) of a hydraulic or pneumatic actuating cylinder. The upper lever section 2 descends into a lower lever section with a housing 3 which receives an automatic slack adjuster mechanism 4 (partly shown by the end of a worm screw of said mechanism).

The slack adjuster mechanism 4 comprises, among other components, a worm screw (partly shown) and a worm wheel, the splined groove section 5 of it being in rotatably fixed connection with a splined section 6 of a camshaft 7. The camshaft 7 traverses an opening in the housing 3 of the lever 1 so as to be accessible at its face side 8. The housing 3 is closed at least on one of its sides by a cover 9 made of sheet metal. For further general information with respect to the configuration and functioning of such automatic slack adjusters it is e.g. referred to DE 195 34 854 A 1.

Furthermore, opposite to its end at the lever 1, the camshaft 7 comprises a cam, here a S-cam 10 for actuating the brake shoes (not shown) in a brake drum (not shown) via corresponding bearing pins 11 arranged at the brake shoe ends (see exemplarily FIGS. 4a and .b) upon rotation of the camshaft 7.

On the side opposite to the S-cam 10, a wear monitoring device 12 is attached to the camshaft 7.

The wear monitoring device 12 in a first embodiment of the invention is shown in FIGS. 1b and 2a,b. It comprises a ring-shaped housing 13 in which a rotating element in the form of a disc 14 is rotatably guided. Inside the housing 13 corresponding sensor means (not shown) arranged both on the disc 14 and on inner parts of the housing 13 cooperate to sense and calculate the angular position of the disc 14, such as e.g. Hall elements.

Figure 1C:
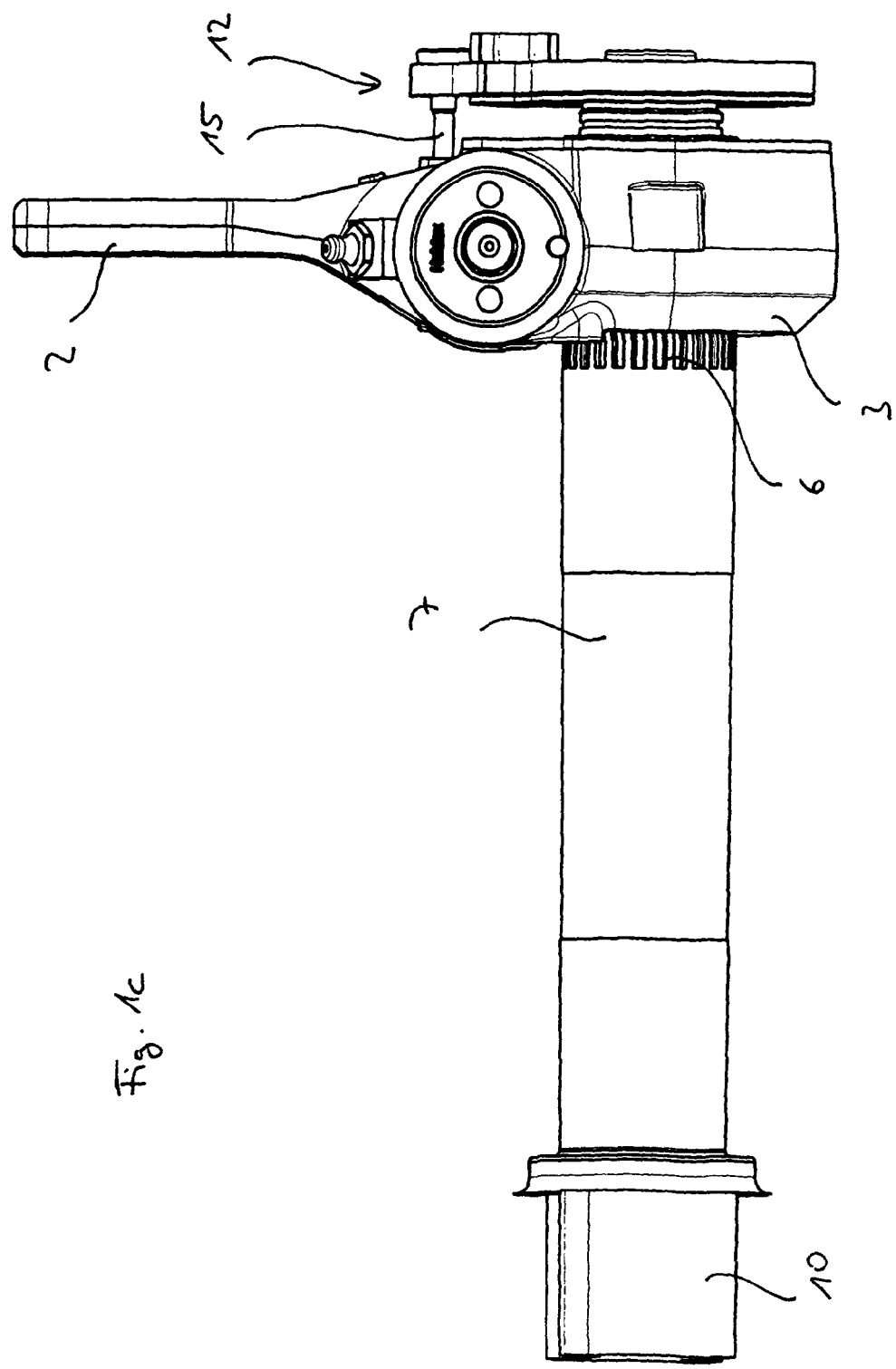

The housing 13 of the wear monitoring device 12 comprises on its upper end fixation means in the form of a pin 15 which cooperates with fixation means in the form of a hole or recess 16 cast or forged in the housing 3 of the lever 1, as can be particularly seen in FIG. 1 c.

Thereby, an angular reference for the wear monitoring device 12 is provided whereby the housing 13 of it remains stationary with respect to the camshaft 7 at adjustments by the automatic slack adjuster mechanism.

As an alternative to angular fixation of the wear monitor housing to the housing of the lever, the wear monitor housing may be equipped with fixation means for angular fixation directly to a fixed part of the vehicle underframe as known from prior art, e.g. publication WO 96/41970 of the applicant. Then the wear monitoring device reflects the rotations of the camshaft during brake actuation and release as well as the turns initiated by the automatic slack adjuster mechanism.

The housing 13 further comprises a connector 17 for electric connection to a power supply and for signal transfer to a superior monitoring system.

The face side 8 of the camshaft 7 comprises a hole 18 drilled into it. Corresponding thereto, the disc 14 comprises a dent or tongue 19 which protrudes towards the face side 8 of the camshaft 7.

According to the invention, the tongue 19 of the disc 14 and the hole 18 of the camshaft 7 are configured to match and thereby form alignment means by which the camshaft 7 and the disc 14 can be only mounted together in one possible angular position.

Therefore, as the position of the tongue 19 on the disc 14 is predetermined on the one hand and as the housing 13 of the wear monitoring device 12 provides an angular reference with respect to the disc 14 by means of the fixation means 15 and 16 on the other hand, one defined angular position between the disc 14 and the camshaft 7 is realized, for which adjustment works do not become necessary upon installation anymore in order to ensure proper functioning of the wear monitoring device 12.

Once properly aligned with the camshaft 7 so that the tongue 19 can mate with the hole 18, the disc 14 of the wear monitoring device 12 will be rotatably and axially fixed to the camshaft 7 by a washer 20 and a bolt 21 to be screwed into a corresponding threaded opening 22 in the face side 8 of the camshaft 7.

The tongue 19 of the disc 14 can be manufactured in a most cost-effective way, if the disc 14 is made of sheet metal and the tongue 19 will be stamped and bent out, correspondingly.

Figure 3B:
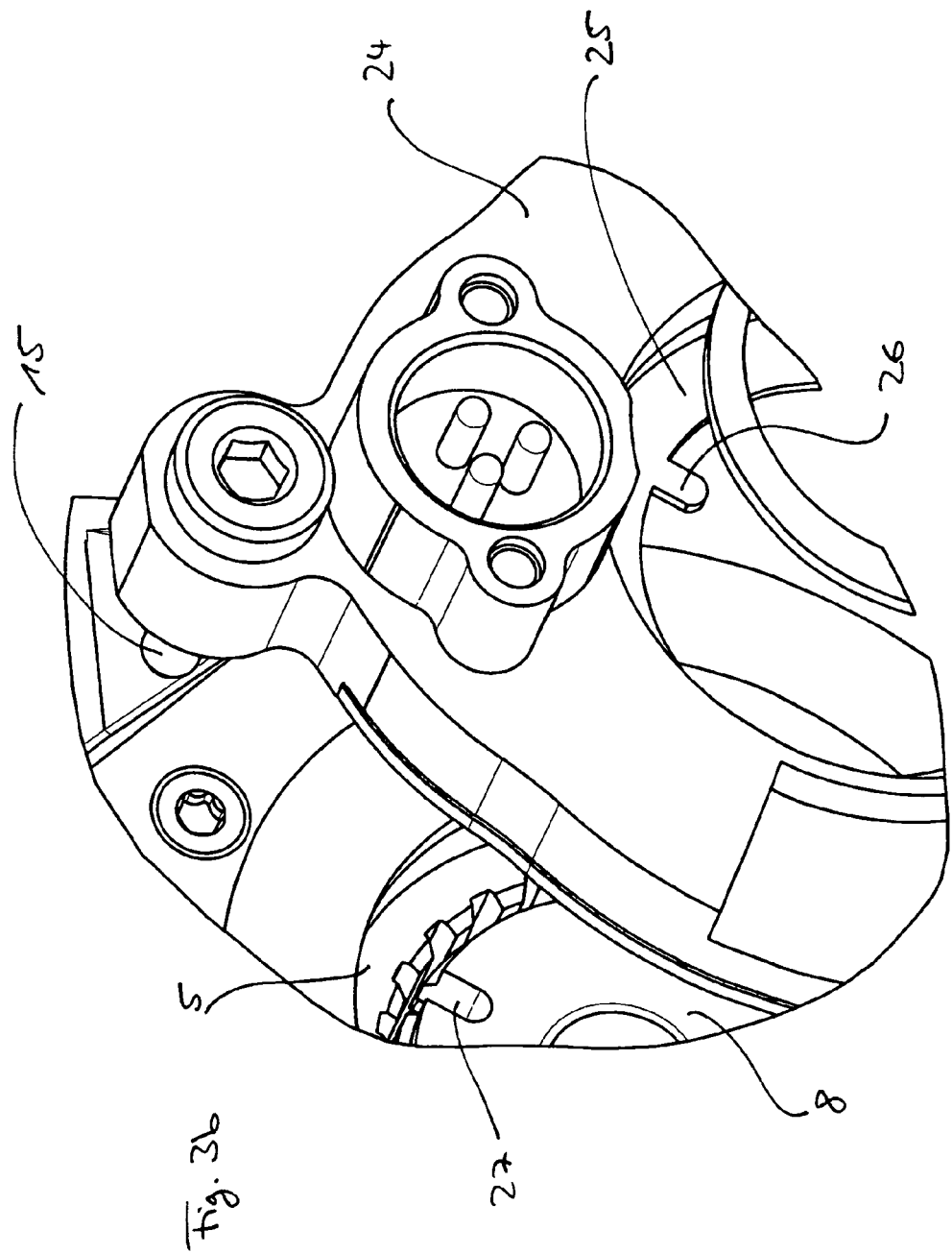
FIG. 3B is an enlarged view of FIG. 3a showing alignment means according to the invention.
Figure 3:
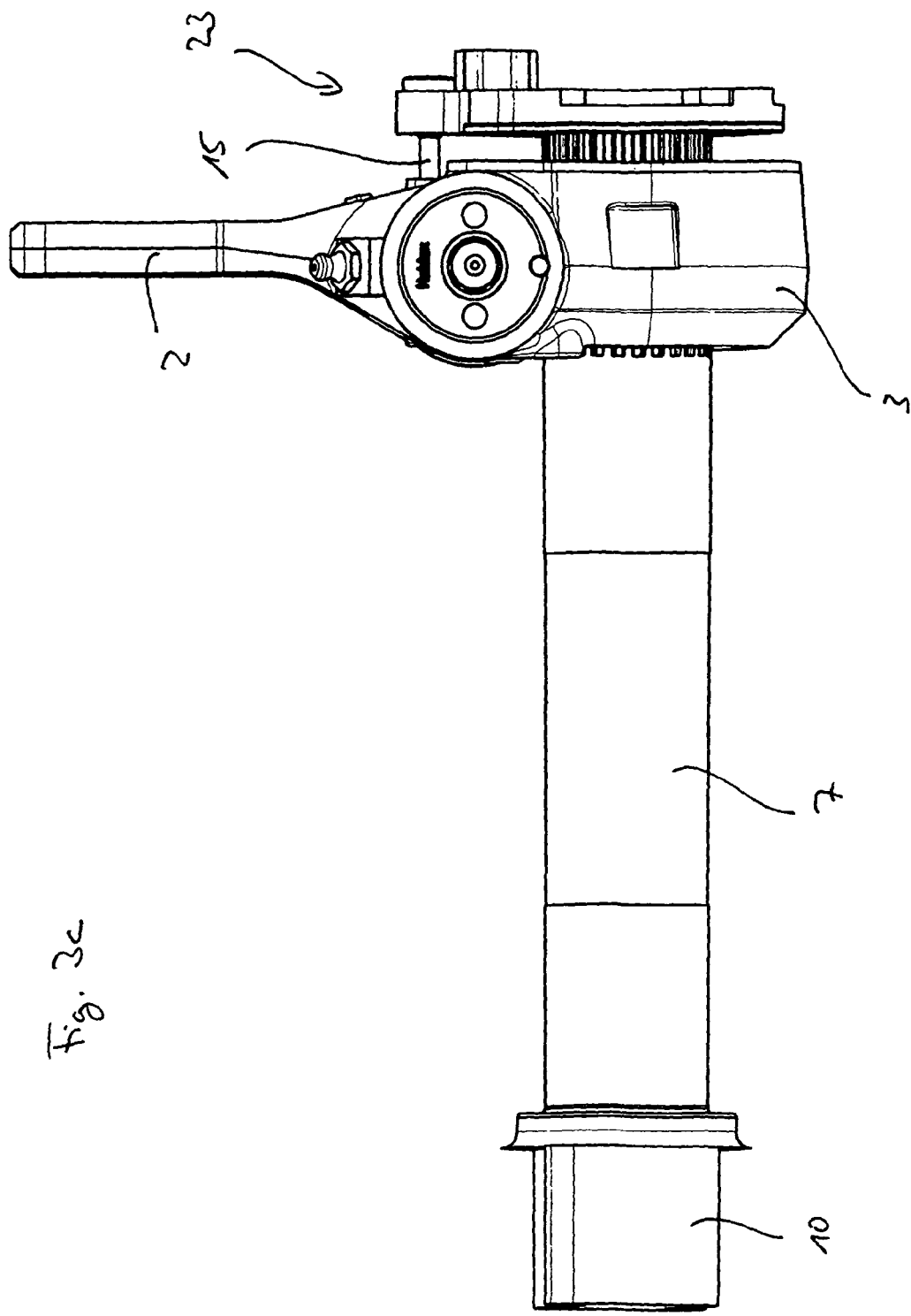

FIGS. 3a-c show an alternative solution with a wear monitoring device 23 in a second embodiment of the invention.

The principle of alignment remains the same, whereby the alignment means are different.

The wear monitoring device 23 again comprises a ring-shaped housing 24 in which a rotating element in the form of a ring 25 is rotatably guided.

The ring 25 comprises a tongue 26 which radially protrudes towards the center of the ring 25. The tongue 26 is configured to match with a recess 27 in the camshaft 7, which also protrudes from its periphery radially into the face side 8 of it.

As in the first embodiment, the tongue 26 and the recess 27 form alignment means which are configured and arranged to allow only one single defined angular position between the camshaft 7 and the rotating element of the wear monitoring device 23.

The ring 25 will be held in place against the camshaft 7 by means of a locking ring 28 which will be received in a groove on the camshaft 7.

FIGS. 4a and 4b schematically explain the displacement of the camshaft upon the wear compensation process, wherein FIG. 4a shows the status of unworn brake shoes and FIG. 4b the status of worn brake shoes.

The S-cam 10 cooperates with bearing pins 11 which are forming the free end of brake shoes (not shown). If the brake shoes are unworn, there is not compensation. The hole 18 which is connected to the rotating element of the wear monitoring device is in a defined angular position which indicates the unworn status.

Upon advancing wear, the automatic brake adjuster mechanism in the lever 1 turns the camshaft 7 counter-clockwise. Accordingly, the position of the hole 18 is shifted by a compensation angle a which position is sensed by the wear monitoring device due to the connection between the alignment means.

The invention claimed is:

1. A brake assembly comprising a camshaft for the actuation of brake shoes in a brake drum and a lever actuating the camshaft, the camshaft comprising opposite to its cam end a splined section, whereby the lever is being rotatably fixedly connected to the splined section by a splined groove section, further comprising a wear monitoring device for measurement of the wear status of the brake shoes, the wear monitoring device comprising a housing statically arranged relative to the camshaft and a rotating element rotatably arranged in the housing and rotatably fixedly connected to the splined section of the camshaft, said rotating element configured to provide an angular position to be sensed, characterized in that the camshaft comprises at least one first alignment mechanism and in that the wear monitoring device comprises at least one second alignment mechanism, wherein the first and second alignment mechanisms are configured to cooperate with each other and are arranged to allow only one particular angular position between the camshaft and the rotating element of the wear monitoring device, wherein the first alignment mechanism of the camshaft is arranged on one of a peripheral surface of the splined section or a surface defining a distal end of the splined section.

2. The drum brake assembly of claim 1, in which the rotating element of the wear monitoring device comprises the second alignment mechanism in such a way that only one particular angular position between the camshaft and the rotating element and in relation to the stationary housing of the wear monitoring device is possible.

3. The drum brake assembly of claim 2, in which the first and second alignment mechanisms of both the camshaft and the rotating element are configured so as to also rotatably fixedly connect the camshaft with the rotating element.

4. The drum brake assembly of claim 1, in which the first alignment mechanism of the camshaft is arranged on the peripheral surface of the splined section.

5. The drum brake assembly of claim 4, in which the first alignment mechanism is made as a geometric alteration in the form of a recess, hole, protrusion or deviation in the repetitive pattern of the splines.

6. The drum brake assembly of claim 1, in which the first alignment mechanism of the camshaft is arranged on the surface defining the distal end of the splined section.

7. The drum brake assembly of claim 6, in which the first alignment mechanism is made as a hole or protrusion.

8. The drum brake assembly of claim 2, in which the second alignment mechanism of the rotating element is made as a hole or protrusion.

9. The drum brake assembly of claim 1, in which the housing of the wear monitoring device is rotatably fixedly connected to the lever or to a vehicle underframe part.

10. A camshaft for actuation of brake shoes in a brake drum of a drum brake assembly comprising a cam end cooperating with the brake shoes and opposite of its cam end a splined section for rotatably fixedly connection to an actuating lever, characterized by a first alignment mechanism which is configured and arranged to cooperate with a second alignment mechanism of a wear monitoring device for the drum brake assembly so as to allow only one particular angular position between the camshaft and the wear monitoring device, wherein the first alignment mechanism of the camshaft is arranged on one of a peripheral surface of the splined section or a surface defining a distal end of the splined section.

11. The camshaft of claim 10, in which the first alignment mechanism is arranged on the peripheral surface of the splined section.

12. The camshaft of claim 11, in which the first alignment mechanism is made as a geometric alteration in the form of a recess, hole, protrusion or deviation in the repetitive pattern of the splines.

13. The camshaft of claim 10, in which the first alignment mechanism is arranged on the surface defining the distal end of the splined section.

14. The camshaft of claim 13, in which the first alignment mechanism is made as a hole or protrusion.

* * * * *